US009429725B2

(12) United States Patent
Shao et al.

(10) Patent No.: US 9,429,725 B2
(45) Date of Patent: Aug. 30, 2016

(54) BIDIRECTIONAL PARALLEL OPTICAL TRANSCEIVER MODULE AND A METHOD FOR BIDIRECTIONALLY COMMUNICATING OPTICAL SIGNALS OVER AN OPTICAL LINK

(71) Applicant: Avago Technologies General IP (Singapore) Pte. Ltd., Singapore (SG)

(72) Inventors: Bing Shao, Sunnyvale, CA (US); Ye Chen, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/866,765

(22) Filed: Apr. 19, 2013

(65) Prior Publication Data

US 2014/0314422 A1    Oct. 23, 2014

(51) Int. Cl.
| | |
|---|---|
| G02B 6/26 | (2006.01) |
| G02B 6/42 | (2006.01) |
| G02B 6/36 | (2006.01) |
| H04B 10/40 | (2013.01) |

(52) U.S. Cl.
CPC ........... *G02B 6/4246* (2013.01); *G02B 6/4214* (2013.01); *H04B 10/40* (2013.01)

(58) Field of Classification Search
CPC . G02B 6/4214; G02B 6/4246; G02B 6/4292
USPC .............. 385/16–18, 31, 37, 47, 48
See application file for complete search history.

(56) References Cited

U.S. PATENT DOCUMENTS

| | | | |
|---|---|---|---|
| 6,198,864 B1 | 3/2001 | Lemoff et al. | |
| 6,441,934 B1 | 8/2002 | Boord et al. | |
| 6,574,398 B2 | 6/2003 | Coldren et al. | |
| 6,888,988 B2* | 5/2005 | Vancoille et al. | 385/47 |
| 6,892,009 B2* | 5/2005 | Ito | G02B 6/25 345/173 |
| 6,941,047 B2 | 9/2005 | Capewell et al. | |
| 7,991,290 B2* | 8/2011 | Tanaka | G02B 6/4246 398/135 |
| 8,032,032 B2 | 10/2011 | Chand et al. | |
| 2003/0152336 A1 | 8/2003 | Gurevich | |
| 2005/0089268 A1* | 4/2005 | Chen et al. | 385/24 |
| 2009/0028579 A1 | 1/2009 | Deng | |
| 2010/0278482 A1* | 11/2010 | Adachi et al. | 385/33 |
| 2012/0002284 A1* | 1/2012 | McColloch et al. | 359/558 |
| 2012/0063721 A1* | 3/2012 | Chen | 385/33 |
| 2014/0226988 A1* | 8/2014 | Shao | H04B 10/40 398/139 |

FOREIGN PATENT DOCUMENTS

JP    2002-534709 A    10/2002

OTHER PUBLICATIONS

First Office Action issued by State Intellectual Property Office, PRC (China), Pat. Application No. 20141066567.9.

* cited by examiner

*Primary Examiner* — Robert Tavlykaev

(57) ABSTRACT

Bidirectional parallel optical transceiver modules for use in optical links and methods for communicating bidirectionally over the links are provided. The bidirectional parallel optical transceiver modules have features that ensure relatively low optical crosstalk, relatively low return loss and relatively high SNR. In addition, the modules have an in-line, zig-zag configuration that allows the modules to be compact and to have high bidirectional channel density for achieving high bandwidth.

36 Claims, 13 Drawing Sheets

BIDIRECTIONAL PARALLEL OPTICAL TRANSCEIVER MODULE AND A METHOD FOR BIDIRECTIONALLY COMMUNICATING OPTICAL SIGNALS OVER AN OPTICAL LINK

TECHNICAL FIELD OF THE INVENTION

The invention relates to optical communications networks over which data is communicated in the form of optical signals transmitted and received over optical waveguides. More particularly, the invention relates to bidirectional optical links, bidirectional parallel optical transceiver modules for use in the links, and methods for bidirectionally communicating optical signals over the links.

BACKGROUND OF THE INVENTION

In optical communications networks, optical transceivers are used to transmit and receive optical signals over optical fibers. An optical transceiver generates amplitude and/or phase and/or polarization modulated optical signals that represent data, which are then transmitted over an optical fiber coupled to the transceiver. Each transceiver includes a transmitter side and a receiver side. On the transmitter side, a laser light source generates laser light and an optical coupling system receives the laser light and optically couples, or images, the light onto an end of an optical fiber. The laser light source typically is made up of one or more laser diodes that generate light of a particular wavelength or wavelength range. The optical coupling system typically includes one or more reflective elements, one or more refractive elements and/or one or more diffractive elements. On the receiver side, a photodiode detects an optical data signal transmitted over an optical fiber and converts the optical data signal into an electrical signal, which is then amplified and processed by electrical circuitry of the receiver side to recover the data. The combination of the optical transceivers connected on each end of the optical fiber and the optical fiber itself is commonly referred to as an optical fiber link.

In high-speed optical fiber links (e.g., 10 Gigabits per second (Gb/s) and higher), multimode optical fibers are often used to carry the optical data signals. Such links are widely used today in data centers and super computers. In such links, certain link performance characteristics, such as the link transmission distance, for example, are dependent in part on the design of the optical coupling system, the modal bandwidth of the fiber, and the relative intensity noise (RIN) of the laser diode. The modal bandwidth of the fiber and the RIN of the laser diode can be affected by the launch conditions of the laser light into the end of the multimode optical fiber. The launch conditions are, in turn, dependent upon the properties of the laser diode itself and upon the design and configuration of the optical coupling system.

While various transceiver and optical fiber link designs enable the overall bandwidth, or data rate, of optical fiber links to be increased, there are limitations on the extent to which currently available technologies can be used to improve the bandwidth of an optical fiber link. It has been shown that receiver-based electronic dispersion compensation (EDC) techniques in combination with particular modulation formats can be used to increase the bandwidth of optical fiber links. It is also known that multiple optical links can be combined to achieve an optical link having a higher data rate than that of each of the individual optical links that form the combination. However, in order to achieve such a link, multiple sets of parallel optics and a corresponding number of optical fibers are needed, which significantly adds to the costs associated with such links. Therefore, there is difficulty associated with scaling such links to achieve increasingly higher bandwidths.

Recently, attempts have been made to design bidirectional optical links. In bidirectional optical links, data is transmitted and received over the same optical fiber. Therefore, bidirectional optical links are attractive in terms of potentially reducing the number of components (e.g., optical fibers) that are needed to form the link. For this same reason, bidirectional optical links are also attractive in terms of scalability. In addition, many data centers have existing multimode fiber infrastructures that could potentially be used in bidirectional links to increase bandwidth without having to add fibers. However, bidirectional optical links also present challenges in terms of dealing with optical crosstalk, return loss and signal-to-noise ratio (SNR).

A need exists for a bidirectional optical link that is capable of operating at relatively high data rates while achieving relatively low return loss, relatively low optical crosstalk and a relatively high SNR.

SUMMARY OF THE INVENTION

The invention is directed to bidirectional parallel optical transceiver modules for use in the links and methods for communicating bidirectionally over optical links. The bidirectional parallel optical transceiver module comprises a mounting surface, an array of light sources mounted on the mounting surface, an array of receive light detectors mounted on the mounting surface, and an optics system disposed above the mounting surface. The mounting surface is generally a planar surface that lies in a plane that is parallel to an X-Y plane of an X, Y, Z Cartesian coordinate system. Each light source is capable or producing a respective optical signal in response to receiving a respective electrical signal. Each light detector is capable of producing a respective electrical signal in response to receiving a respective optical signal. End faces of a plurality of optical fibers of at least one optical fiber cable are mechanically coupled to the optics system. The optics system couples optical signals produced by respective light sources into respective end faces of respective optical fibers. The optics system couples optical signals passing out of respective end faces of respective optical fibers onto respective receive light detectors of the array of receive light detectors. Each of the optical fibers simultaneously transmits and receives optical signals.

The method comprises providing first and second bidirectional parallel optical transceiver modules coupled to opposite ends of an optical fiber cable, where each module has the configuration described above, and simultaneously transmitting and receiving optical signals in each of the modules.

These and other features and advantages of the invention will become apparent from the following description, drawings and claims.

DETAILED DESCRIPTION OF AN ILLUSTRATIVE EMBODIMENT

Figure 1:
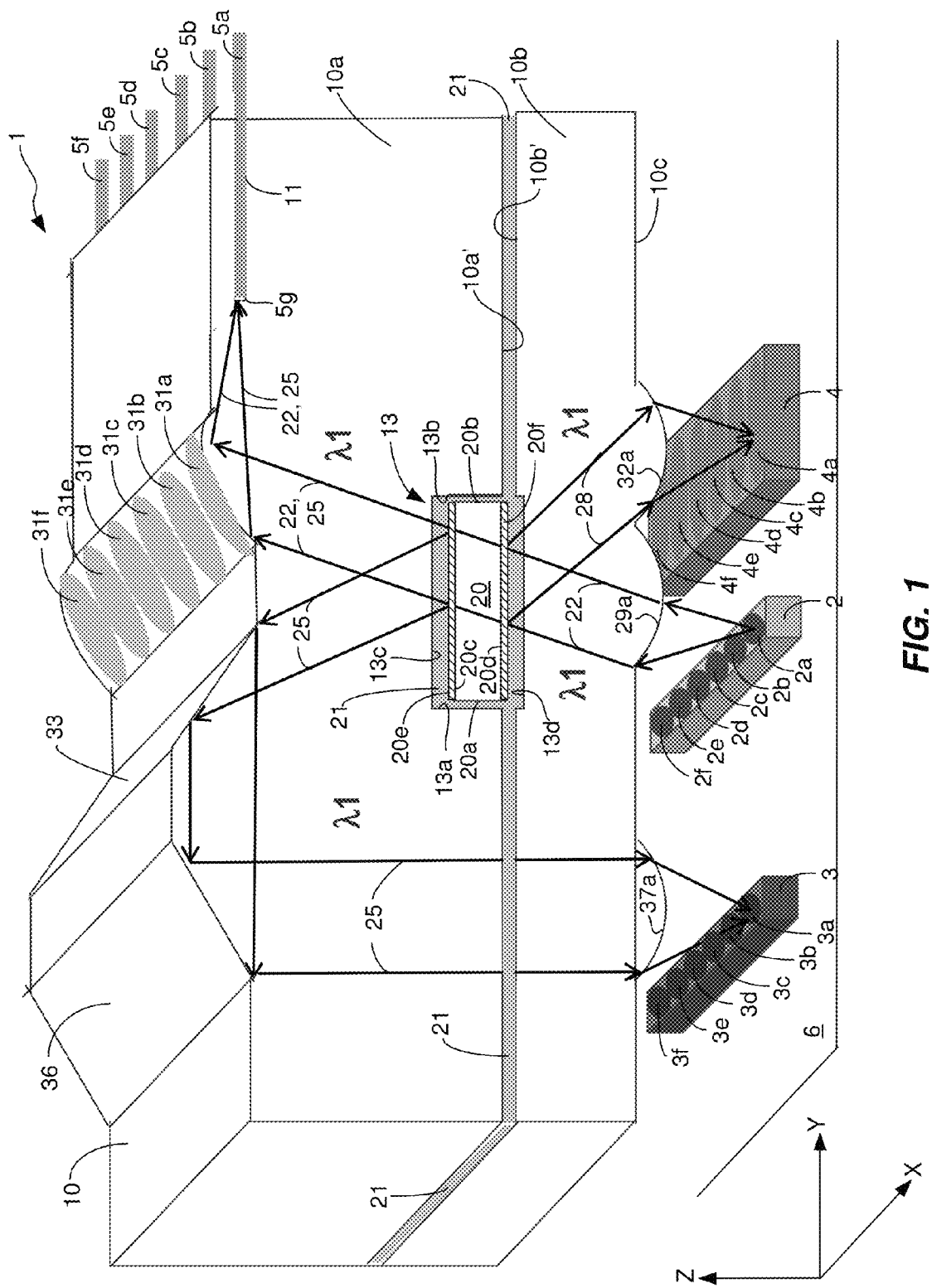
FIG. 1 illustrates a perspective view of a bidirectional parallel optical transceiver module in accordance with an illustrative embodiment.

The invention is directed to bidirectional parallel optical transceiver modules and methods for communicating bidirectionally over optical links. The bidirectional parallel optical transceiver modules have features that ensure relatively low optical crosstalk, relatively low return loss and relatively high SNR. In addition, the modules have an in-line, zig-zag configuration that allows the modules to be compact and to have high bidirectional channel density for achieving high bandwidth.

In accordance with some illustrative embodiments, features of the modules accommodate existing form factors for existing vertical cavity surface emitting laser diode (VCSEL) arrays and p-doped-instrinsic-n-doped (P-I-N) diode arrays, which facilitates designing and assembling the modules. In accordance with some illustrative embodiments, a single wavelength is used for transmitting and receiving optical signals over a bidirectional optical link. In accordance with other illustrative embodiments, different wavelengths are used for transmitting and receiving optical signals over a bidirectional link. The parallel optical transceiver modules have optics systems that include beam splitters and other optical features that ensure relatively low optical crosstalk, relatively low return loss and a relatively high SNR. Various illustrative embodiments will now be described with reference to FIGS. 1-13 in which like reference numerals represent like features, elements or components.

FIG. 1 illustrates a perspective view of a bidirectional parallel optical transceiver module 1 in accordance with an illustrative embodiment. For illustrative purposes, the bidirectional parallel optical transceiver module 1 is shown as having six bidirectional channels and associated components, although it could have any number of bidirectional channels and associated components. The six bidirectional channels include a VCSEL array 2 having six VCSELs 2a-2f for producing six optical signals to be transmitted, and a P-I-N diode array 3 having six P-I-N diodes 3a-3f for converting six received optical signals into six respective electrical signals. The module 1 also includes a monitor diode array 4 having six monitor diodes 4a-4f for monitoring the optical signals produced by the VCSELs 2a-2f, respectively. There are six optical fibers 5a-5f connected to the module 1 for carrying optical signals produced by the VCSELs 2a-2f, respectively, and for carrying optical signals received by the receive P-I-N diodes 3a-3f, respectively.

In accordance with this illustrative embodiment, the same wavelength, $\lambda 1$, is used for transmitting and receiving optical signals. Thus, each of the VCSELs 2a-2f generates an optical signal having wavelength $\lambda 1$ and each P-I-N diode 3a-3f receives an optical signal having wavelength $\lambda 1$ and converts it into an electrical signal. The module 1 includes an optics system 10 that optically couples optical signals between the ends 5g of the optical fibers 5a-5f and either the VCSELs 2a-2f or the P-I-N diodes 3a-3f, depending on whether the optical signals are being transmitted or received. Only one of the ends 5g of the optical fibers 5a-5f is visible in FIG. 1. The ends 5g of the optical fibers 5a-5f may be secured to the optics system 10 in a variety of ways, as will be described below in more detail. In accordance with this illustrative embodiment, portions of the fibers 5a-5f that include the ends 5g are disposed within respective bores 11 formed in the optics system 10. The ends 5g may be secured to the bores 11 by refractive index (RI)-matching epoxy (not shown for purposes of clarity). This type of optical fiber coupling arrangement is commonly referred to in the art as a butt-end coupling arrangement. As an alternative to disposing the ends 5g of the fibers 5a-5f in bores 11, respective V-shaped grooves (not shown) may be formed in the optics system 10, in which case the ends 5g would be placed in the respective V-shaped grooves and then a cover or cap (not shown) would be placed over the fibers and secured to the optics system 10 to sandwich the fibers between the cover or cap and the V-grooves.

The arrays 2, 3 and 4 are mounted on a mounting surface 6 that is parallel to an X-Y plane of the X, Y, Z Cartesian Coordinate system shown in FIG. 1. The mounting surface 6 may be, for example, an upper surface of a printed circuit board (PCB). Mounting the arrays 2, 3 and 4 on the same mounting surface in a common plane facilitates assembly by allowing the same pick-and-place system that is used to align, orient and mount other electrical components on the PCB surface to also be used to align, orient and mount the arrays 2, 3 and 4 on the mounting surface. The optics system 10 would then be mounted on the mounting surface 6 to complete the assembly process. In such cases, spacers (not shown for purposes of clarity) may be disposed on the mounting surface 6 or on the lower surface of the optics system 10 to provide the necessary vertical spacing (Z-dimension) between the lower surface of the optics system 10 and the upper surfaces of the arrays 2, 3 and 4.

In accordance with this illustrative embodiment, the optics system 10 has an upper optical part 10a and a lower optical part 10b that interface with one another along a lower surface 10a' of the upper optical part 10a and an upper surface 10b' of the lower optical part 10b. The material of which the upper and lower optical parts 10a and 10b are made is transparent to wavelength λ1. In accordance with this illustrative embodiment, the surfaces 10a' and 10b' are parallel to each other and to the X-Y plane of the X, Y, Z Cartesian Coordinate system. In accordance with this illustrative embodiment, a pocket 13 is formed in the upper optical part 10a for holding an optical beam splitter 20. The pocket 13 has opposing vertical side walls 13a and 13b that are parallel to each other and to an X-Z plane of the Cartesian Coordinate system and has an upper lateral wall 13c that is parallel to the surfaces 10a' and 10b' and to the X-Y plane of the Cartesian Coordinate system. The pocket 13 extends across the upper optical part 10a in the X-direction from one side of the upper optical part 10a to the other. A portion 13d of the upper surface 10b' of the lower optical part 10b forms a lower lateral wall of the pocket 13. The lower lateral wall 13d of the pocket 13 is generally parallel to the upper lateral wall 13c of the pocket. Thus, in accordance with this illustrative embodiment, the pocket 13 is generally rectangular in shape, but could have other shapes.

The beam splitter 20 is disposed in the pocket 13 and has a shape that is generally complementary to the shape of the pocket 13. The beam splitter 20 is typically slightly smaller in size than the pocket 13 to allow a RI-matching epoxy 21 to be disposed in the pocket 13 in between the walls 13a-13d of the pocket 13 and the sides 20a-20d of the beam splitter 20. The RI-matching epoxy 21 is in contact with the walls 13a-13d of the pocket 13 and with the sides 20a-20d of the beam splitter 20. The RI-matching epoxy 21 is also disposed in between the upper surface 10b' of the lower optical part 10b and the lower surface 10a' of the upper optical part 10a. The RI-matching epoxy 21 fixedly positions the beam splitter 20 within the pocket 13 and fixedly secures the upper and lower optical parts 10a and 10b to one another.

The optical pathways of transmitted, received and monitored optical signals will now be described with reference to one of the bidirectional channels shown in FIG. 1 that includes VCSEL 2a, receive P-I-N diode 3a, monitor diode 4a, and optical fiber 5a. Arrows 22 represent an optical signal produced by VCSEL 2a and transmitted from the module 1 over optical fiber 5a. Arrows 25 represent an optical signal received over optical fiber 5a in module 1 and received on receive P-I-N diode 3a. Arrows 28 represent a portion of an optical signal produced by VCSEL 2a that is received by monitor diode 4a and used to monitor the optical power of VCSEL 2a. Arrows labeled 22, 25 correspond to a shared optical pathway for optical signals 22 being transmitted and optical signals 25 being received.

The optical signal 22 produced by the VCSEL 2a is incident on a biconic lens 29a of an array of six biconic lenses (not shown for purposes of clarity) formed in a lower surface 10c of the lower optical part 10b. The centers of the lenses 29a-29f have the same Y and Z coordinates, but have different X coordinates such that the centers of the lenses 29a-29f are aligned with the centers of the VCSELs 2a-2f, respectively. The lens 29a collimates the optical signal 22 and directs it onto the lower side 20d of the beam splitter 20. The beam splitter 20 has a first filter 20e disposed on its upper side 20c and a second filter 20f disposed on its lower side 20d. Each of the filters 20e and 20f typically comprises one or more thin-film coating layers. The second filter 20f is partially reflective and partially transparent to optical signals of wavelength 80 1. The beam splitter 20 performs a beam splitting function that passes a portion of the optical signal 22 that is incident on the second filter 20f and directs that portion of the optical signal 22 onto irregular lens 31a of an array of irregular lenses 31a-31f. The centers of the lenses 31a-31f have the same Y and Z coordinates, but have different X coordinates such that the centers of the lenses 31a-31f are aligned with the centers of the end faces 5g of the fibers 5a-5f, respectively. The lens 31a focuses the optical signal 22 into the end face 5g of the fiber 5a.

The second filter 20f reflects a portion of the beam 22 that is incident thereon onto an aspherical lens 32a of an array of six aspherical lenses (not shown for purposes of clarity) formed in the lower surface 10c of the lower optical part 10b. Arrows 28 represent this reflected portion of the optical signal. The lens 32a focuses the reflected portion 28 of the optical signal onto the monitor diode 4a. The monitor diode 4a receives the optical signal and converts it into an electrical signal, which may be used to monitor the optical power level of the optical signals being produced by the VCSEL 2a, and adjust the optical power level, if necessary or desirable. The manner in which optical feedback is used to monitor and adjust the operations of laser diodes is well known and therefore will not be discussed herein in the interest of brevity.

In the receive direction, the optical signal 25 passing out of the end face 5g of the fiber 5a is collimated by lens 31a and the collimated beam 25 is directed onto the first filter 20e disposed on the upper side 20c of the beam splitter 20. The first filter 20e reflects the beam 25 onto a flat total internal reflection (TIR) lens 33 formed in the upper optical part 10a. The flat TIR lens 33 reflects the beam 25 onto a biconic lens 36 formed in the upper optical part 10a, which then reflects the beam onto an aspherical lens 37a of an array of six aspherical lenses (not shown for purposes of clarity) formed in the lower surface 10c of the lower optical part 10b. The centers of the lenses 37a-37f have the same Y and Z coordinates, but have different X coordinates such that the centers of the lenses 37a-37f are aligned with the centers of the receive P-I-N diodes 3a-3f, respectively. The lens 37a then focuses the beam onto the receive P-I-N diode 3a. The receive P-I-N diode 3a converts the received optical signal into an electrical signal that is further processed by other circuitry (not shown for purposes of clarity) of the module 1 to recover the data that was contained in the optical signal.

In a bidirectional link, there can be near-end crosstalk and far-end crosstalk. With respect to module 1, near-end crosstalk might occur if a portion of the optical signal 22 to be transmitted were to be reflected at the end face 5g such that some of the reflected light is received by one or more of the P-I-N diodes 3a-3f of module 1. Far-end crosstalk in module 1 might occur if a portion of the optical signal 22 being transmitted over fiber 5a were to be reflected from the end face (not shown) of the fiber 5a disposed at the opposite end of the link back into module 1 and onto one or more of the P-I-N diodes 3a-3f of module 1. Of course, there can be other sources of crosstalk within the modules and external to the modules along the link. Reducing crosstalk improves the SNR. Return loss with respect to module 1 might occur if a portion of the optical signal intended to be received by the receive P-I-N diodes 3a-3f of the module 1 is not received due to reflection of the incoming optical signal on fiber 5a at the end face 5g.

The configuration of the optics system 10 of the module 1 eliminates or at least greatly reduces such undesirable reflections, thereby reducing crosstalk and return loss and increasing the SNR. All of the lenses 29a-29f, 31a-31f, 32a-32f, 33, 36, and 37a-37f are integrally formed in the optics system 10, which is typically made of a polymer material, such as, for example, Ultem polyetherimide. The RI-matching epoxy disposed in the bore 11 provides a refractive-index-matched interface between the end face 5g of the fiber 5a and the irregular lens 31a. The side of the irregular lens 31a that faces the end face 5g of the fiber 5a is flat so that it can be RI-matched by the RI-matching epoxy to the end face 5g of the fiber 5. This RI matching of the end face 5g with the lens 31a reduces reflection at the end face 5g, thereby reducing crosstalk and return loss.

The RI-matching epoxy 21 that surrounds the beam splitter 20 provides RI matching at the interfaces between the upper surface 10b' of the lower optical part 10b and the beam splitter 20 and between the beam splitter 20 and the lower surface 10a' of the upper optical part 10a. This RI matching prevents unintended reflections from occurring at these interfaces. The RI-matching epoxy 21 disposed between the upper surface 10b' of the lower optical part 10b and the lower surface 10a' of the upper optical part 10a also prevents reflections at the interfaces between these surfaces to prevent reflections from occurring where the collimated beam 25 passes from the upper optical part 10a into the lower optical part 10b. The filters 20e and 20f also reduce crosstalk and return loss. Using some or all of these features in combination greatly reduces crosstalk and return loss and greatly increases the SNR.

The horizontal orientation (sides 20c and 20d parallel to the X-Y plane) of the beam splitter 20 relative to the VCSEL array 2 provides certain advantages, although it is not necessary to orient the beam splitter 20 in this way. One such advantage is that it allows the angle of incidence (AOI) of the optical signal 22 relative to the normal to the lower side 20d of the beam splitter 20 to be very small (e.g., typically, but not necessarily, between about 0° and 15°). The angle of reflection (AOR) of the optical signal 28 is equal to the AOI. One advantage of the small AOI is that it allows filter coatings to be easily and inexpensively placed on the upper and/or lower sides 20c and 20d of the beam splitter, as will be described below in more detail. Such filter coatings can provide additional optical isolation that further reduces crosstalk and improves SNR. Another advantage of the small AOI is that it can obviate the need to provide the RI-matching epoxy 21 in the pocket 13, which can reduce costs and facilitate the assembly process. Another advantage of horizontally orienting the beam splitter 20 is that it makes the assembly process easier to perform and more reliable as compared to having to orient the beam splitter 20 at a particular tilt angle.

The optical pathways represented by arrows 22, 25 and 28 form a zig-zag pattern across the upper and lower optical parts 10a and 10b as the optical signals pass between the various optical elements of the optics system 10. This zig-zag pattern allows the module 1 to be relatively compact in the Y-dimension without sacrificing performance in terms of crosstalk, return loss and SNR. It should also be noted that the VCSEL 2a, the receive P-I-N diode 3a, the monitor diode 4a, and the end face 5g of the fiber 5a are in the same line in the X-Y plane. This in-line configuration is true for all of the channels. The in-line configuration allows the arrays 2, 3 and 4 to be mounted on the same mounting surface 6, which provides the aforementioned advantages in terms of assembly and cost. The in-line, zig-zag configuration also uses very little space in the X-dimension, which allows the X-dimensional spacing between adjacent channels to be relatively small. This, in turn, allows the module 1 to be very compact in size and to have a higher channel density. Another advantage of this configuration is that it allows existing VCSEL arrays and P-I-N diode arrays that have a standard 250 micrometer (micron) pitch between adjacent VCSELs or P-I-N diodes to be used in the module.

As will be understood by those of skill in the art, many variations may be made to the module 1 shown in FIG. 1 without deviating from the scope of the invention. Some such variations will now be described with reference to FIGS. 2-12. FIGS. 2-12 are side plan views of bidirectional parallel optical transceiver modules that are similar in many respects, but different in some respects, to the module 1 shown in FIG. 1. Like the module 1 shown in FIG. 1, the modules shown in FIGS. 2-12 have multiple parallel channels that are spaced apart from one another in the X-direction. The modules shown in FIGS. 2-12 also have the in-line, zig-zag configuration and associated advantages described above with reference to FIG. 1. For ease of illustration, only a single channel is depicted in each of the side plan views shown in FIGS. 2-12.

Figure 2:
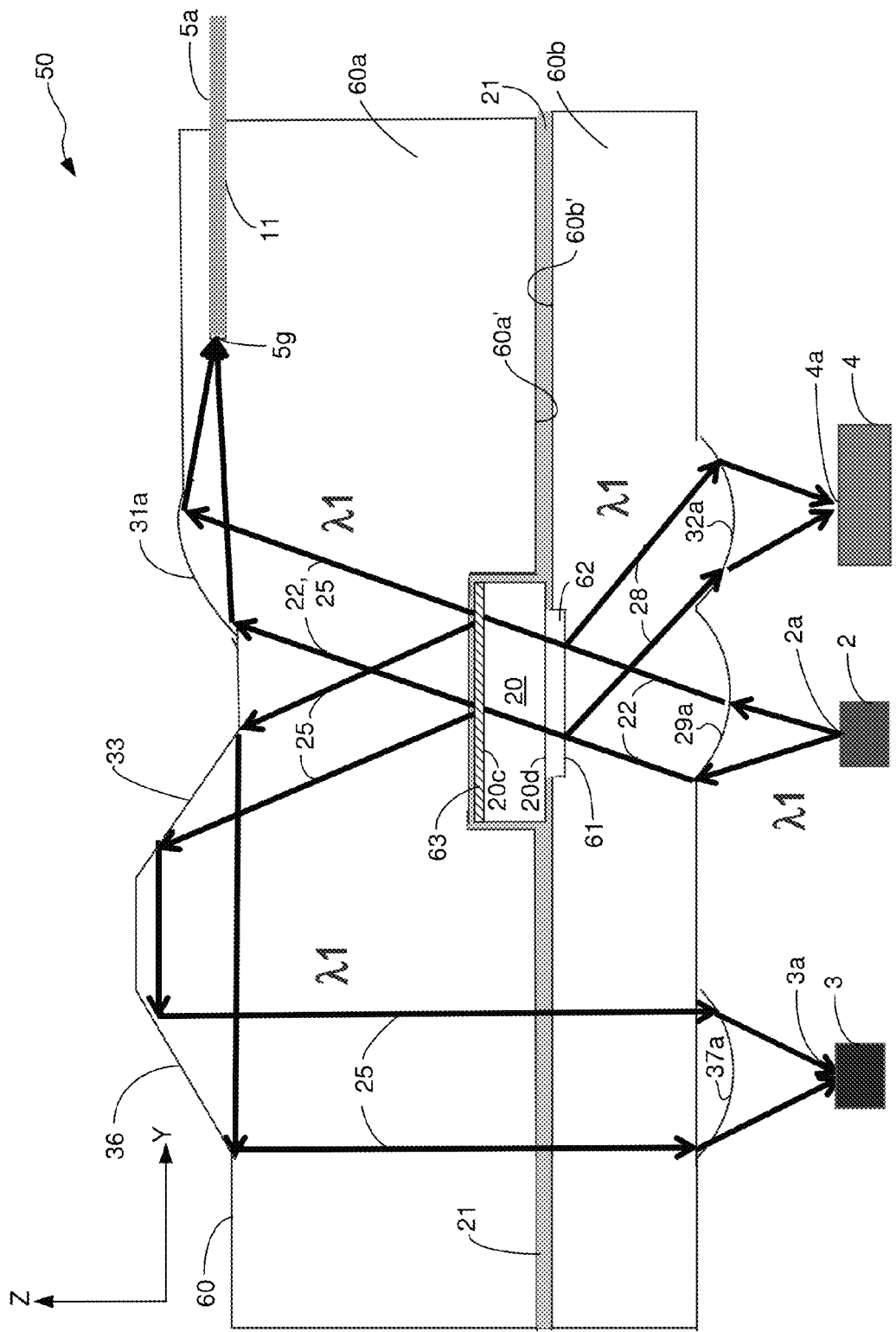
FIG. 2 illustrates a side plan view of a bidirectional parallel optical transceiver module in accordance with another illustrative embodiment.

With reference to FIG. 2, the module 50 includes an optics system 60 that is identical to the optics system 10 shown in FIG. 1 except that the lower optical part 60b of the optics system 60 shown in FIG. 2 is slightly different from the lower optical part 10b shown in FIG. 1. The upper optical part 60a of the optics system 60 shown in FIG. 2 is identical to the upper optical part 10a of the optics system 10 shown in FIG. 1. The lower optical part 60b is different from the lower optical part 10b only in that an indentation 61 has been formed in the upper surface 60b' of the lower optical part 60b where the upper surface 60b' interfaces with the lower side 20d of the beam splitter 20. This interface forms an air gap 62 that creates a refractive index gradient at this interface that performs the beam splitting function that passes a portion of the optical signal 22 through the beam splitter 20 and that reflects a portion of the optical signal 22 onto lens 32a, which then focuses the light portion 28 onto the monitor diode 4a. The portion of the optical signal 22 that passes through the beam splitter 20 is incident on lens 31a, which operates on the light in the manner described above with reference to FIG. 1.

The upper side 20c of the beam splitter 20 has a filter 63 disposed thereon that performs the function of separating the transmitted optical signal 22 from the received optical signal 25. The filter 63 is typically a layer of coating material that is transparent to the optical signal 22 of wavelength λ1 propagating in the direction from lens 29a toward lens 31a, but is totally reflective to the optical signal 25 of wavelength λ1 propagating in the direction from the lens 31a toward the filter 63. The optical elements 33, 36 and 37a operate on the optical signal 25 in the manner described above with reference to FIG. 1 to direct the optical signal 25 onto the receive P-I-N diode 3a.

The inclusion of the air gap 62 obviates the need for a filter on the lower side 20d of the beam splitter 20, which reduces costs and facilitates assembly. Including the filter 63 on the upper side 20c of the beam splitter 20 provides improved optical isolation between the VCSEL 2a and the receive P-I-N diode 3a for further reducing crosstalk and return loss, while at the same time allowing the same wavelength λ1 to be used for optical signals being transmitted and received.

Figure 3:
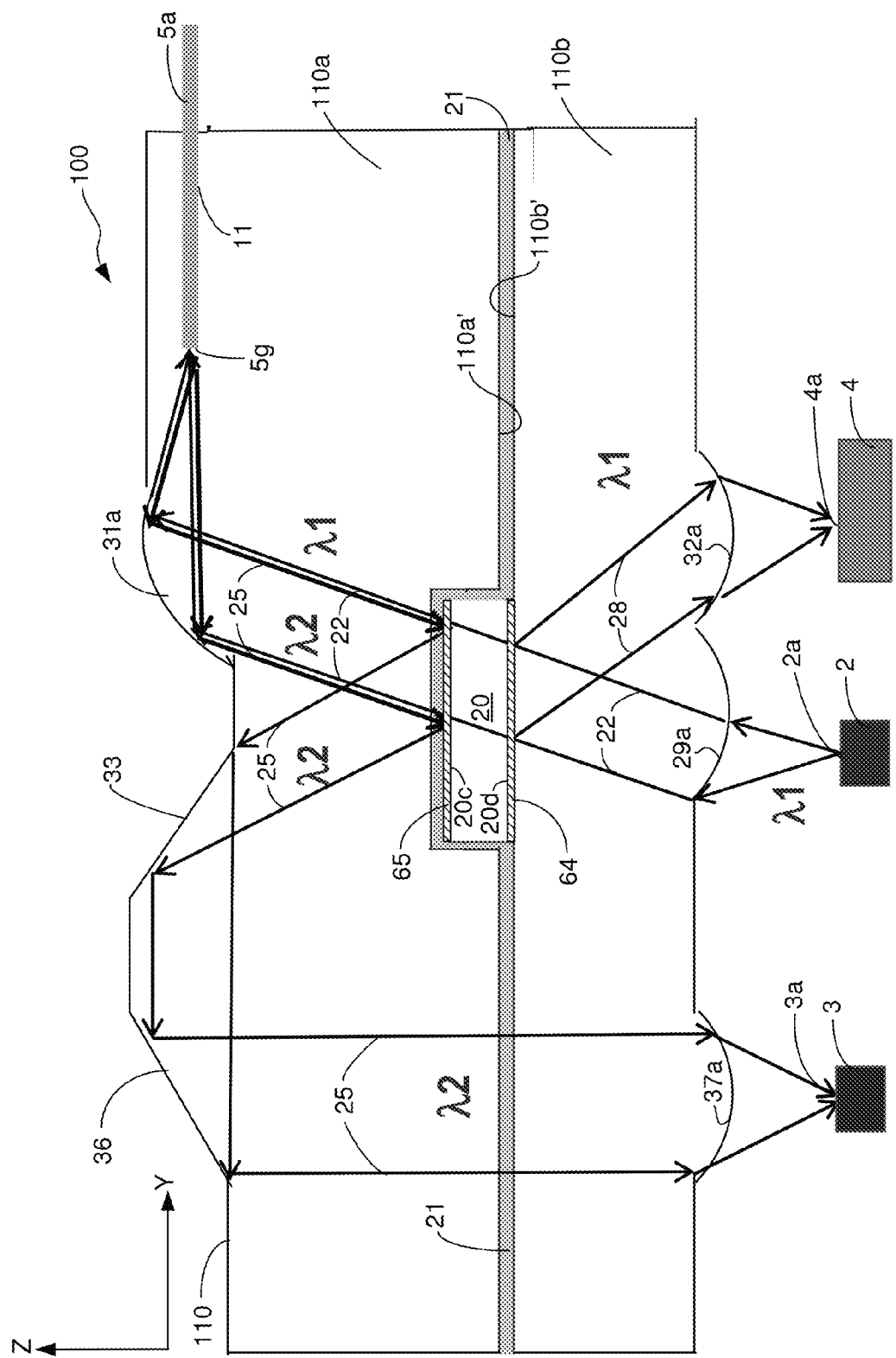
FIG. 3 illustrates a side plan view of a bidirectional parallel optical transceiver module in accordance with another illustrative embodiment.

With reference to FIG. 3, the module 100 includes an optics system 110 that is identical to the optics system 60 shown in FIG. 2 except that the lower optical part 110b of the optics system 10 shown in FIG. 3 is slightly different from the lower optical part 60b shown in FIG. 2. The upper optical part 110a of the optics system 110 shown in FIG. 3 is identical to the upper optical part 60a of the optics system 60 shown in FIG. 2. The lower optical part 110b is different from the lower optical part 60b only in that, unlike the lower optical part 60b shown in FIG. 2, there is no indentation formed in the upper surface 110b' of the lower optical part 110b where the upper surface 110' interfaces with the lower side 20d of the beam splitter 20. Rather, the main beam splitting function that was performed by the air gap 62 shown in FIG. 2 is performed by a second filter 64 disposed on the lower side 20d of the beam splitter 20. This second filter 64 performs the beam splitting function that passes a portion of the optical signal 22 through the beam splitter 20 and that reflects a portion of the optical signal 22 onto lens 32a, which then focuses the reflected light portion 28 onto the monitor diode 4a. The portion of the optical signal 22 that passes through the beam splitter 20 is incident on lens 31a, which operates on the light in the manner described above with reference to FIG. 1.

The upper side 20c of the beam splitter 20 has a filter 65 disposed thereon that performs the function of separating the transmitted optical signal 22 at wavelength λ1 from the received optical signal 25 at wavelength λ2. The filter 65 is at least partially transparent to the optical signal 22 of wavelength λ1 propagating in the direction from lens 29a to lens 31a, but is totally reflective to the optical signal 25 of wavelength λ2 propagating in the direction from the lens 31a toward the filter 65. The filter 65 reflects substantially all of the light of wavelength λ2 onto optical element 33. The optical elements 33, 36 and 37a operate on the optical signal 25 in the manner described above with reference to FIG. 1 to direct the optical signal 25 onto the receive P-I-N diode 3a.

When dual wavelengths are being used in this manner, the VCSELs at the opposite end of the link are producing optical signals having wavelength λ2 and the P-I-N diodes are receiving optical signals at wavelength λ1. Therefore, the properties of the filter 65 at the opposite end of the link would be the reverse of the filter 65 shown in FIG. 3 such that the filter 65 at the opposite end of the link would be at least partially transparent to the optical signal of wavelength λ2 propagating in the direction from lens 29a to lens 31a, but totally reflective to the optical signal of wavelength λ1 propagating in the direction from the lens 31a toward the filter 65. The manner in which suitable filters may be created for this purpose is well known in the art, and therefore will not be further described herein in the interest of brevity.

The inclusion of the filters 64 and 65 provides improved optical isolation between the VCSEL 2a and the receive P-I-N diode 3a for further reducing near-end and far-end crosstalk and return loss, thereby further improving SNR in the module 100 and along the link (not shown for purposes of clarity). The use of different wavelengths for transmitting and receiving optical signals also reduces crosstalk and return loss and improves SNR.

Figure 4:
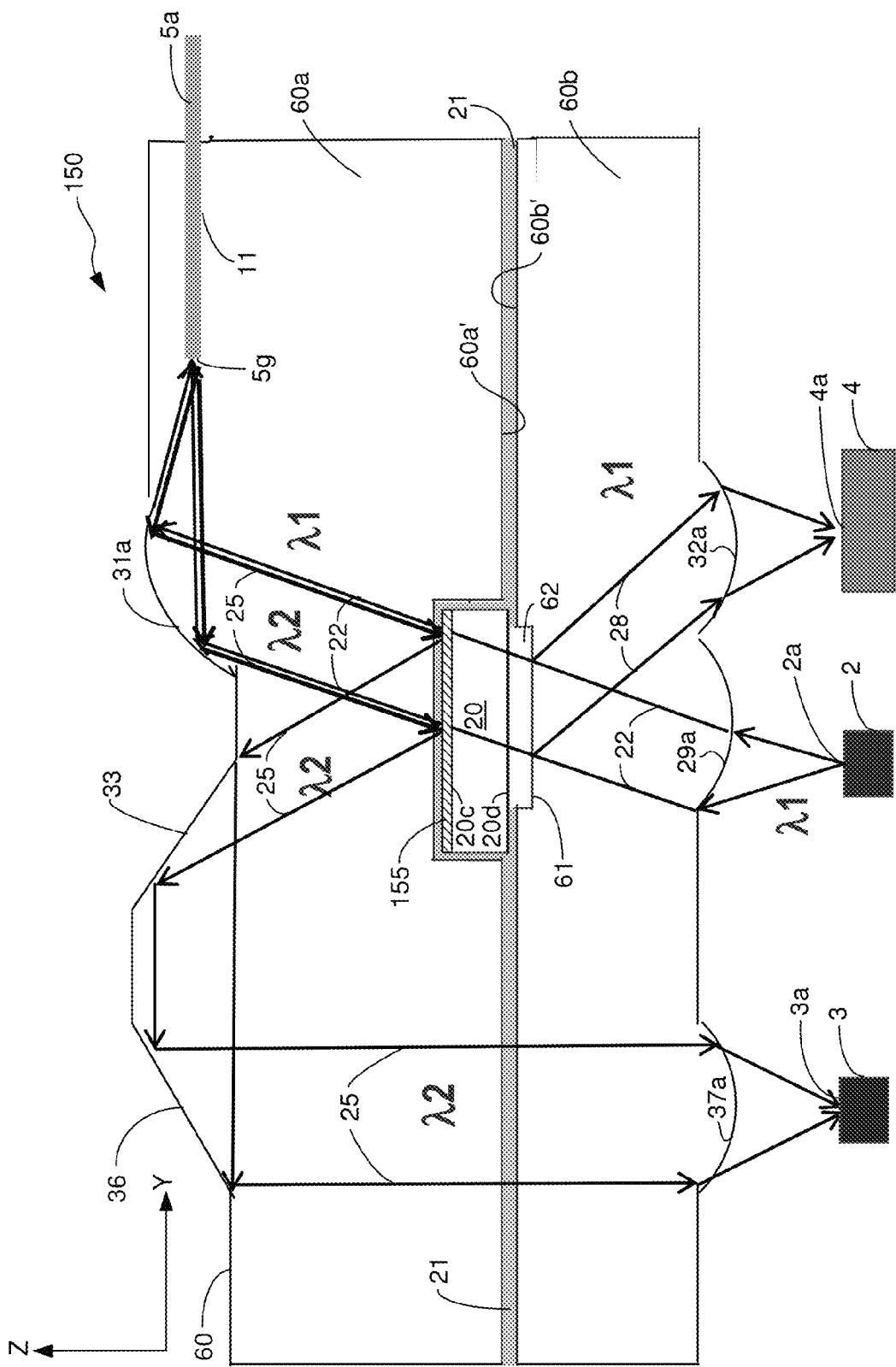
FIG. 4 illustrates a side plan view of a bidirectional parallel optical transceiver module in accordance with another illustrative embodiment.

With reference to FIG. 4, the module 150 is identical to the module 50 shown in FIG. 2 except that first and second wavelengths, λ1 and λ2, respectively, are used for transmitting optical signals 22 and receiving optical signals 25, respectively, and the filter 63 has been replaced by a filter 155. In all other respects, the modules 50 and 150 are identical. In accordance with this embodiment, the filter 155 performs the function of separating the transmitted optical signal 22 at wavelength λ1 from the received optical signal 25 at wavelength λ2. The filter 155 is at least partially transparent to the optical signal 22 of wavelength λ1 propagating in the direction from lens 29a to lens 31a, but is generally totally reflective to the optical signal 25 of wavelength λ2 propagating in the direction from the lens 31a toward the filter 155. The filter 155 reflects substantially all of the light of wavelength λ2 onto optical element 33. The optical elements 33, 36 and 37a operate on the optical signal 25 in the manner described above with reference to FIG. 1 to direct the optical signal 25 onto the receive P-I-N diode 3a.

The inclusion of the filter 155 provides improved optical isolation between the VCSEL 2a and the receive P-I-N diode 3a for further reducing near-end and far-end crosstalk and return loss, thereby further improving SNR in the module 150 and along the link (not shown for purposes of clarity). The use of different wavelengths for transmitting and receiving optical signals also reduces crosstalk and return loss and improves SNR.

Figure 5:
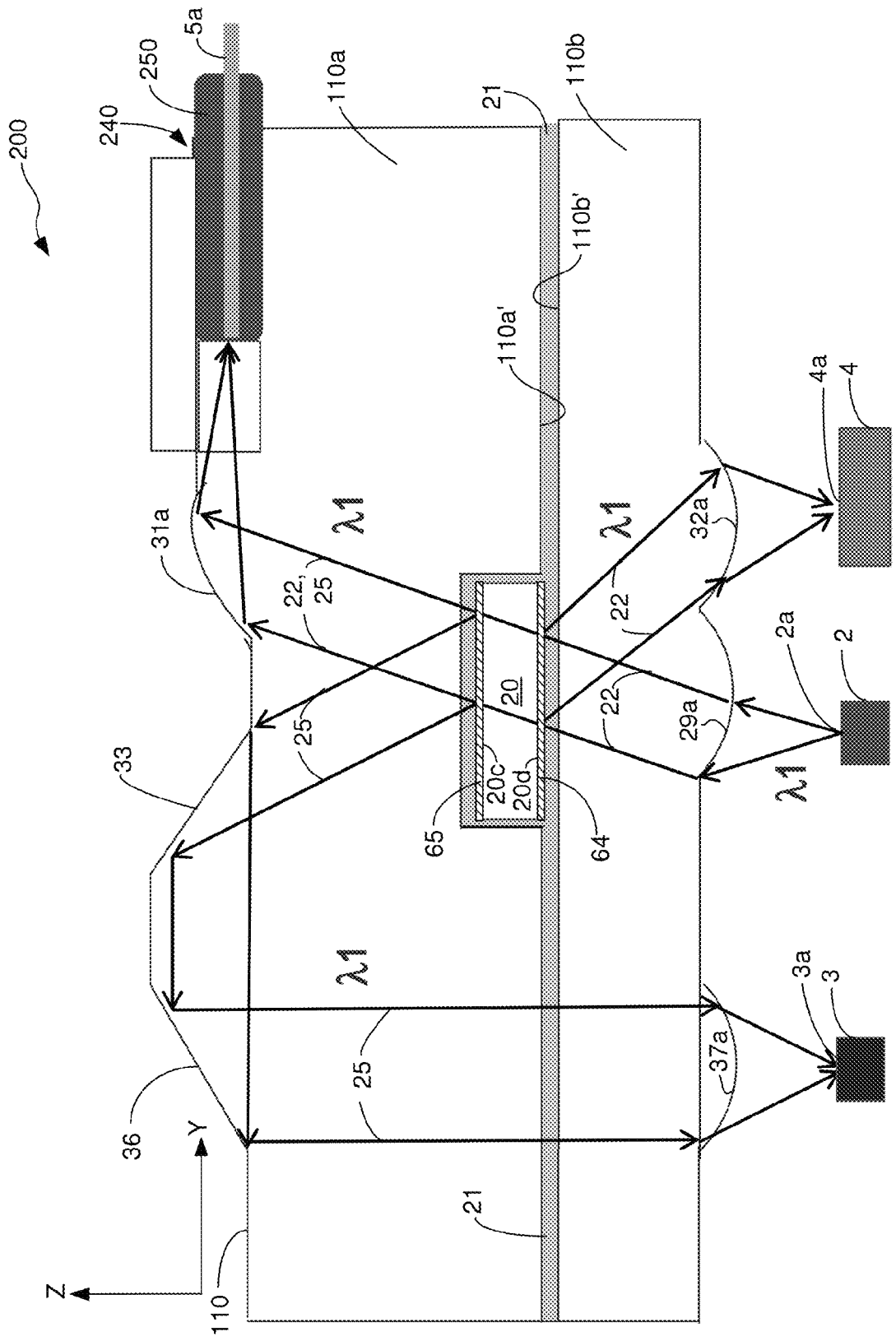
FIG. 5 illustrates a side plan view of a bidirectional parallel optical transceiver module in accordance with another illustrative embodiment.

With reference to FIG. 5, the module 200 is very similar to the module 100 shown in FIG. 3 except that the module 200 uses the same wavelength, λ1, for the optical signals 22 being transmitted and for the optical signals 25 being received, and the module 200 includes a receptacle 240 that is adapted to receive a connector 250 that holds the ends of the optical fibers 5a-5g (only fiber 5a is shown in the side plan view). The receptacle 240 is formed in the upper optical part 110a of the optics system 110. The connector 250 is a multi-fiber connector, such as an MPO connector, for example. The connector 250 is inserted into the receptacle 240 to mechanically couple and optically align the fibers 5a-5f with the respective lenses 31a-31f (only lens 31a is shown in the side plan view of FIG. 5). Typically, the connector 250 and the receptacle 240 each have alignment and locking features thereon that align and interlock the connector 250 with the receptacle 240.

This type of connector/receptacle interface is useful in cases where the module needs to interface with a ribbon cable that is terminated with an MPO connector or similar multi-fiber connector. The in-line configuration of the module 200 facilitates such interfaces in that it makes it possible to have a 250 micron pitch between adjacent channels, which is typically the spacing between adjacent fiber ends in MPO connectors.

The main beam splitting function is performed by the filter 64 disposed on the lower side 20d of the beam splitter 20. The filter 64 passes a portion of the optical signal 22 to allow it to pass through the beam splitter 20, and reflects a portion of the optical signal 22 onto lens 32a. The portion of the optical signal 22 that passes through the beam splitter 20 also passes through filter 65 and is incident on lens 31a, which operates on the light in the manner described above with reference to FIG. 1. The filter 65 disposed on the upper side 20c of the beam splitter 20 performs the function of separating the transmitted optical signal 22 at wavelength λ1 from the received optical signal 25 at wavelength λ1. The filter 65 is at least partially transparent to the optical signal 22 of wavelength λ1 propagating in the direction from lens 29a toward lens 31a, but is totally reflective to the optical signal 25 of wavelength λ1 propagating in the direction from the lens 31a toward the filter 65. Substantially all of the light of wavelength λ1 that is directed onto the filter 65 by the lens 31a is reflected by filter 65 onto optical element 33. The optical elements 33, 36 and 37a operate on the optical signal 25 in the manner described above with reference to FIG. 1 to direct the optical signal 25 onto the receive P-I-N diode 3a.

As indicated above with reference to FIG. 3, the inclusion of the filters 64 and 65 provides improved optical isolation between the VCSEL 2a and the receive P-I-N diode 3a for further reducing near-end and far-end crosstalk and return loss, thereby further improving SNR in the module 100 and along the link (not shown for purposes of clarity).

Figure 6:
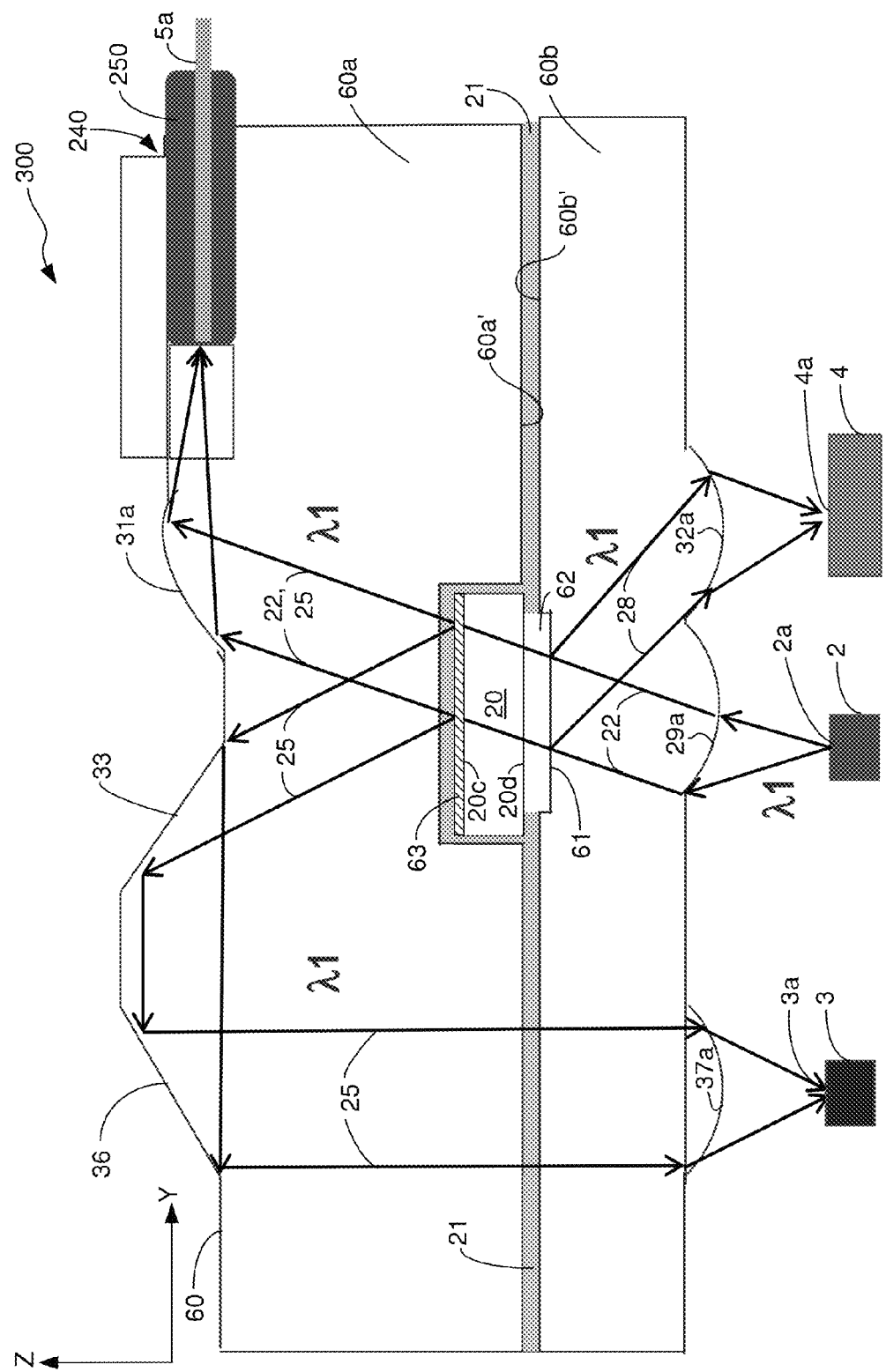
FIG. 6 illustrates a side plan view of a bidirectional parallel optical transceiver module in accordance with another illustrative embodiment.

With reference to FIG. 6, the module 300 is identical to the module 50 shown in FIG. 2, except that unlike the optics system 60 of the module 50 shown in FIG. 2, the optics system 60 of the module 300 shown in FIG. 6 has the receptacle 240 shown in FIG. 5 formed in it for receiving the connector 250 shown in FIG. 5. Thus, the only difference between the module 50 shown in FIG. 2 and the module 300 shown in FIG. 6 is with respect to the manner in which the optical fibers 5a-5f are coupled to the optics system 60. The manner in which the module 300 operates is identical to the manner in which the module 50 operates, which has already been described above with reference to FIG. 2. Like the module 50, the module 300 also has low crosstalk, low return loss and a high SNR.

Figure 7:
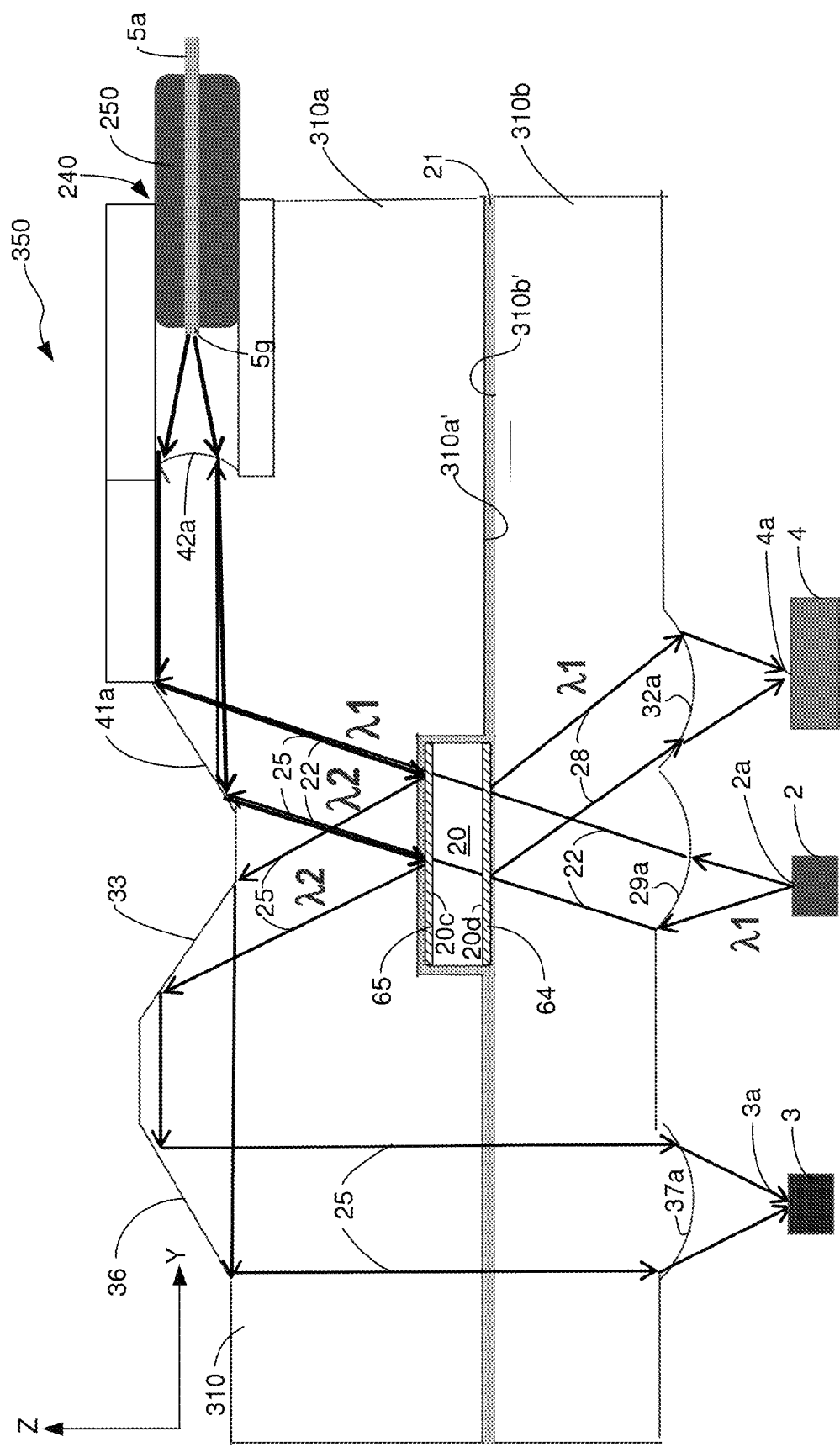
FIG. 7 illustrates a side plan view of a bidirectional parallel optical transceiver module in accordance with another illustrative embodiment.

With respect to FIG. 7, the module 350 is similar to the module 100 shown in FIG. 3. Unlike the optics system 110 of the module 100 shown in FIG. 3, the optics system 310 of the module 350 shown in FIG. 7 has the receptacle 240 shown in FIGS. 5 and 6 formed in it for receiving the connector 250 shown in FIGS. 5 and 6. The optics system 310 comprises upper and lower optical parts 310a and 310b, respectively, having lower and upper surfaces 310a' and 310b', respectively. The lenses 31a-31f shown in FIGS. 1-6 have been replaced by flat TIR lenses 41a-41f and aspherical lenses 42a-42f (only lenses 41a and 42a are visible in the side plan view of FIG. 7). The manner in which the module 350 operates is very similar to the manner in which the module 100 operates, which has already been described above with reference to FIG. 3.

The ends 5g of the fibers 5a-5f are not in contact with the optics system 310 shown in FIG. 7, but rather are disposed in an air gap within the receptacle 240. The flat TIR lenses 41a-41f (only lens 41a is visible) fold the respective collimated light beams, whereas the aspherical lenses 42a-42f (only lens 42a is visible) collimate received optical signals 25 and focus transmitted optical signals into the ends 5g of the optical fibers 5a-5f. In all other respects, the module 350 shown in FIG. 7 operates in the manner described above with reference to the module 100 shown in FIG. 3. Like the module 100 shown in FIG. 3, the module 350 shown in FIG. 7 also has low crosstalk, low return loss and a high SNR.

Figure 8:
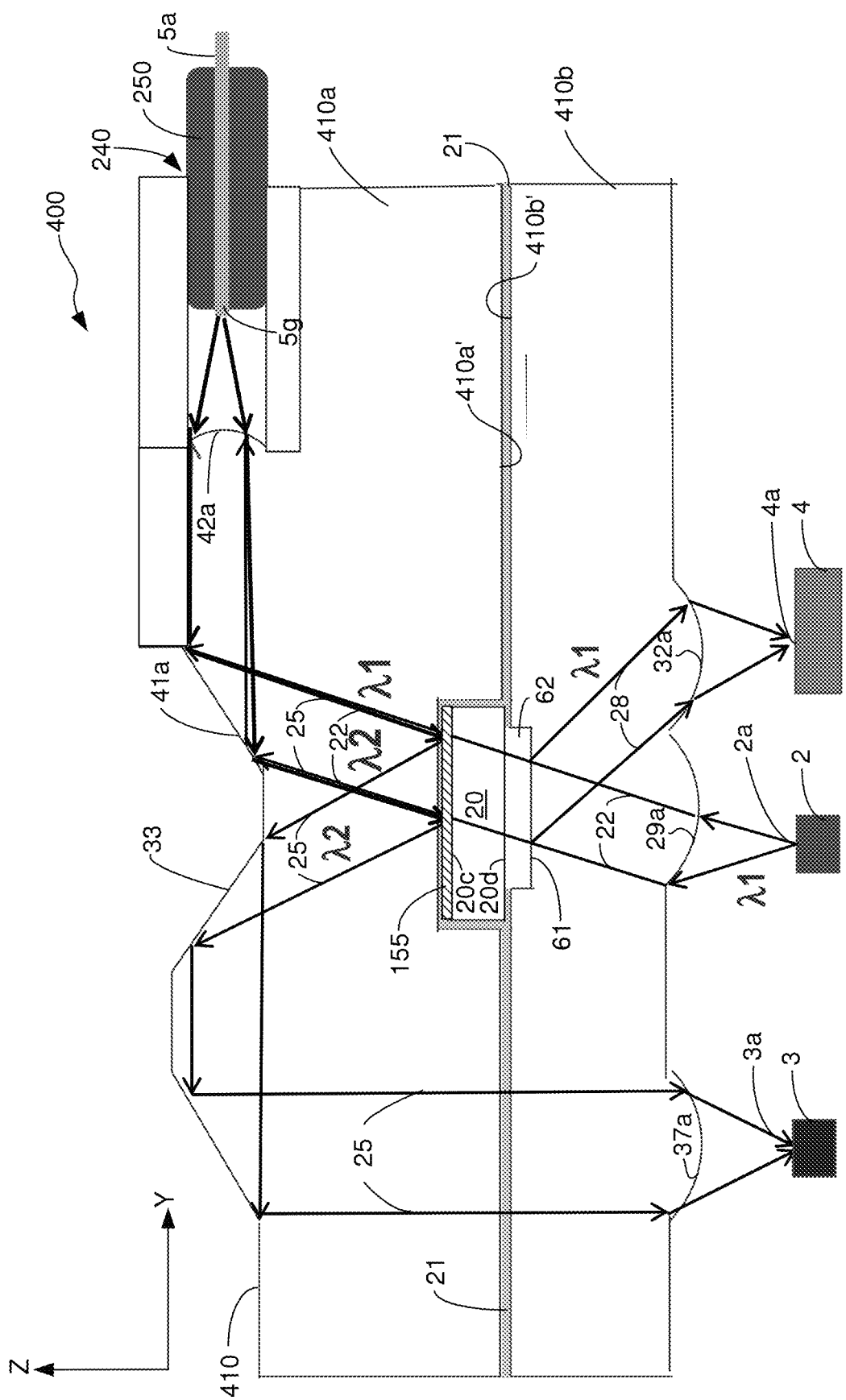
FIG. 8 illustrates a side plan view of a bidirectional parallel optical transceiver module in accordance with another illustrative embodiment.

With respect to FIG. 8, the module 400 is very similar to the module 150 shown in FIG. 4. Unlike the optics system 60 of the module 150 shown in FIG. 4, the optics system 410 of the module 400 shown in FIG. 8 has the receptacle 240 shown in FIGS. 5-7 formed in it for receiving the connector 250 shown in FIGS. 5-7. The optics system 410 comprises upper and lower optical parts 410a and 410b, respectively, having lower and upper surfaces 410a' and 410b', respectively. The lenses 31a-31f shown in FIGS. 1-6 have been replaced by the flat TIR lenses 41a-41f and aspherical lenses 42a-42f, which are formed in the upper optical part 410a of the optics system 410. The manner in which the module 400 operates is very similar to the manner in which the module 150 operates, which has already been described above with reference to FIG. 4. Like the module 150, the module 400 also has low crosstalk, low return loss and a high SNR.

As described above with reference to FIG. 7, the flat TIR lenses 41a-41f (only lens 41a is visible) fold the respective collimated light beams, whereas the aspherical lenses 42a-42f (only lens 42a is visible) collimate received optical signals 25 and focus optical signals being transmitted into the ends 5g of the optical fibers 5a-5f. In all other respects, the module 400 shown in FIG. 8 operates in the manner described above with reference to the module 150 shown in FIG. 4.

Figure 9:
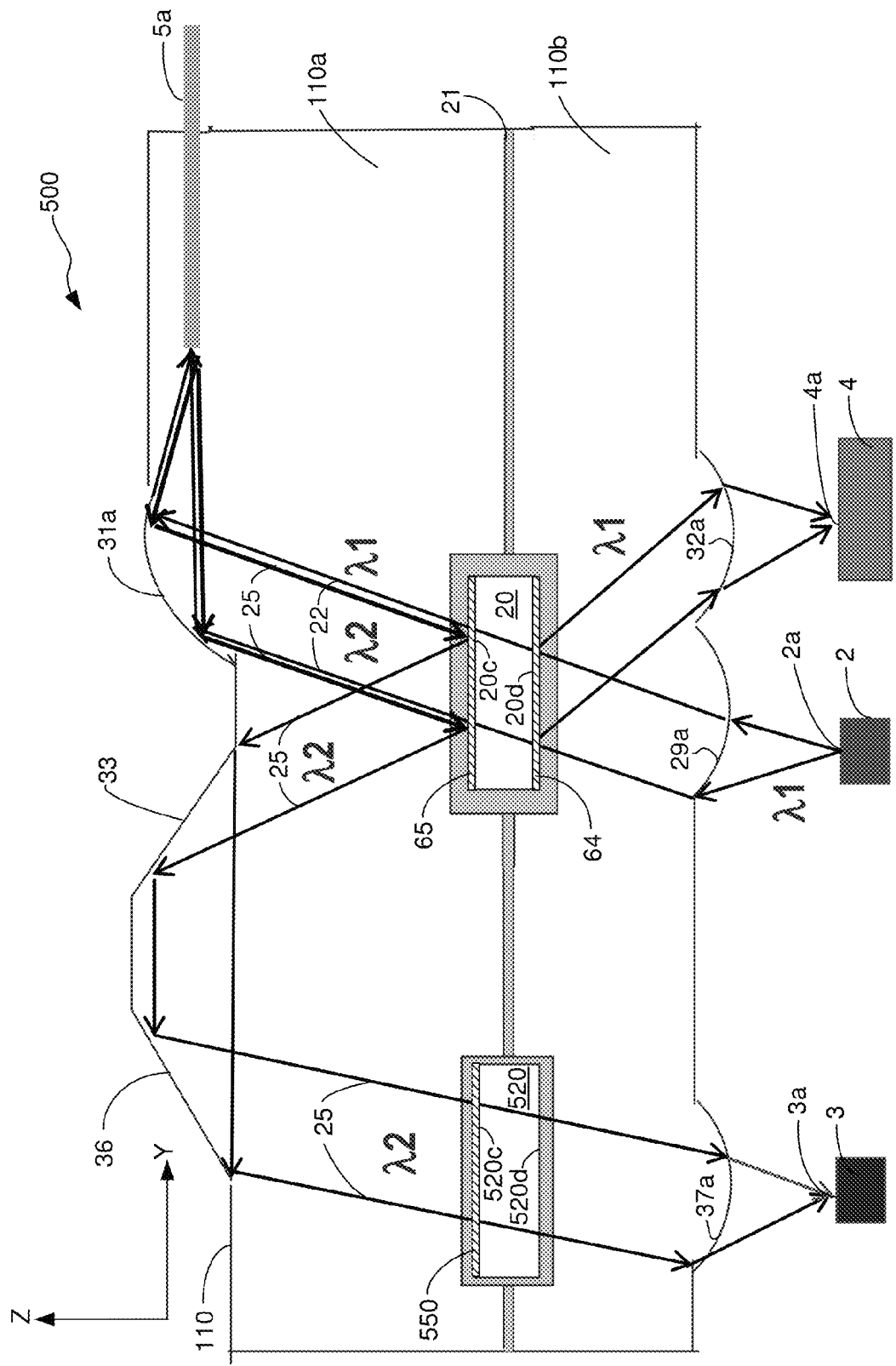
FIG. 9 illustrates a side plan view of a bidirectional parallel optical transceiver module in accordance with another illustrative embodiment.

With respect to FIG. 9, the module 500 is identical to the module 100 shown in FIG. 3 except that the module 500 includes a second beam splitter 520 that may be identical to the beam splitter 20, except that the beam splitter 520 only has a single filter 550 disposed on an upper side 520c of the beam splitter 520. A lower side 520d of the beam splitter may have, but need not have, a filter disposed thereon. The filter 550 is designed to only pass optical signals having wavelength λ2, which are then received by the P-I-N diode 3a. Optical signals having any other wavelengths are blocked by the filter 550. In all other respects, the module 500 operates in the manner described above with reference to the module 100 shown in FIG. 3. The additional beam splitter 520/filter 550 combination provides additional optical isolation for further reducing crosstalk and return loss and increasing SNR.

Figure 10:
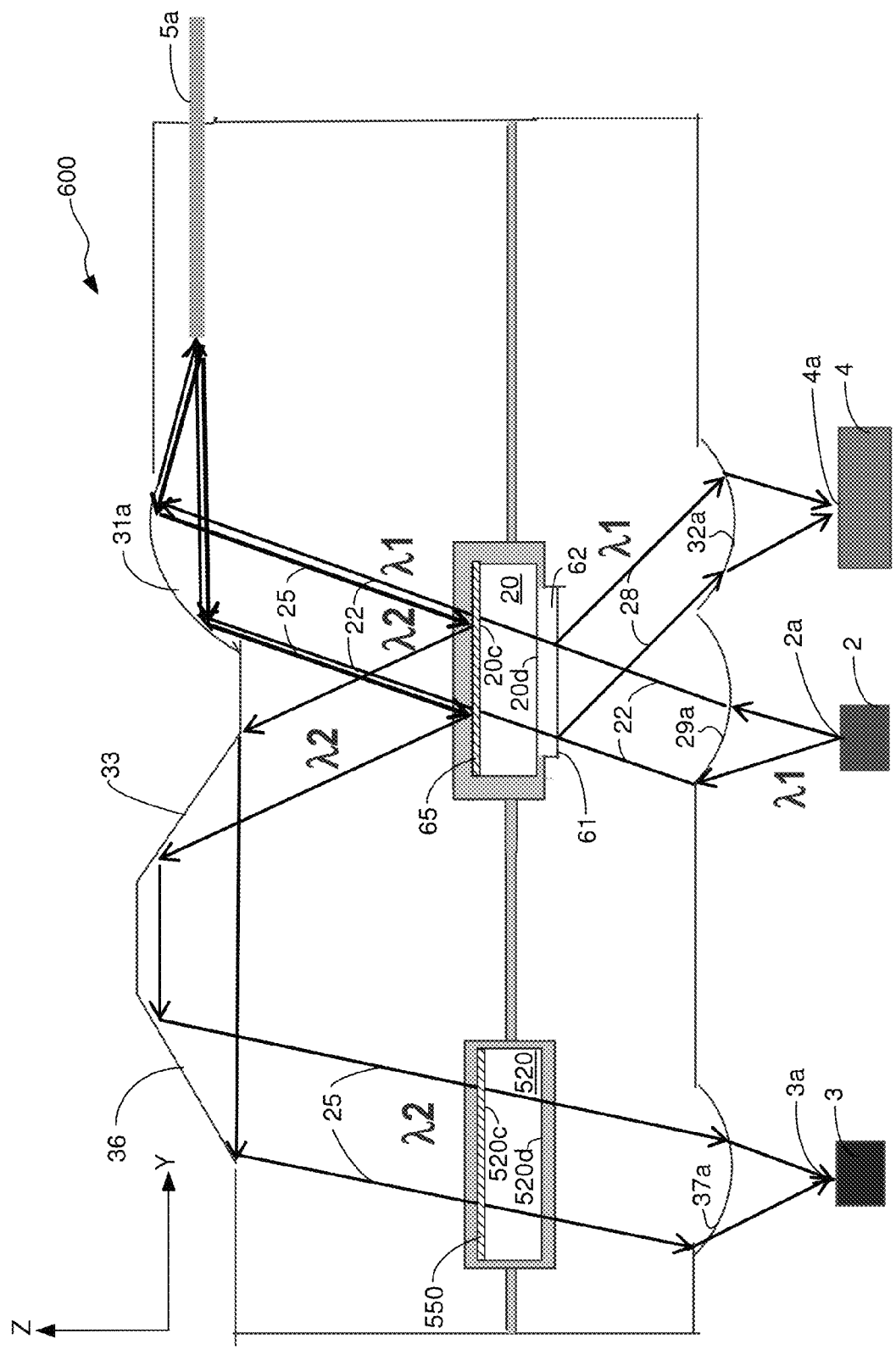
FIG. 10 illustrates a side plan view of a bidirectional parallel optical transceiver module in accordance with another illustrative embodiment.

With respect to FIG. 10, the module 600 is identical to the module 500 shown in FIG. 9 except that the filter 64 disposed on the lower side 20d of the beam splitter 20 has been replaced by the air gap 62 formed by the indentation 61, as described above with reference to FIG. 2. The air gap 62 performs the main beam splitter operations described above with reference to FIG. 2. In all other respects, the module 600 operates in the manner described above with reference to the module 500 shown in FIG. 9. As indicated above with reference to FIG. 9, the additional beam splitter 520/filter 550 combination provides additional optical isolation for further reducing crosstalk and return loss and increasing SNR.

Figure 11:
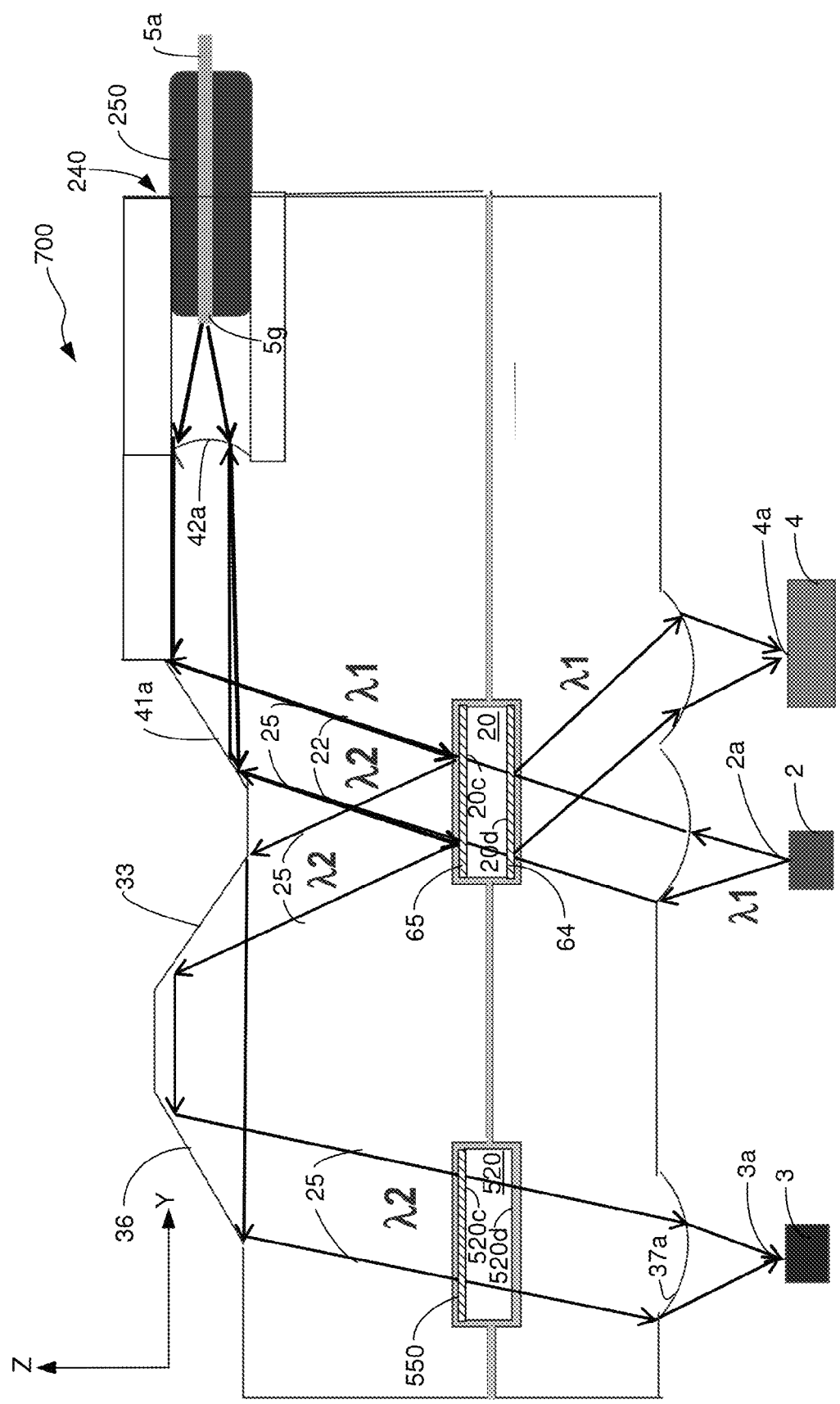
FIG. 11 illustrates a side plan view of a bidirectional parallel optical transceiver module in accordance with another illustrative embodiment.

With respect to FIG. 11, the module 700 is identical to the module 350 shown in FIG. 7 except that the module 700 includes the second beam splitter 520 described above with reference to FIGS. 9 and 10. As indicated above, the second beam splitter 520 has the filter 550 disposed on the upper side 520c thereof. The lower side 520d of the beam splitter may have, but need not have, a filter disposed thereon. The filter 550 is designed to only pass optical signals having wavelength λ2, which are then received by the P-I-N diode 3a. Optical signals having any other wavelengths are blocked by the filter 550. In all other respects, the module 700 operates in the manner described above with reference to the module 350 shown in FIG. 7. As indicated above, the additional beam splitter 520/filter 550 combination provides additional optical isolation for further reducing crosstalk and return loss and increasing SNR.

Figure 12:
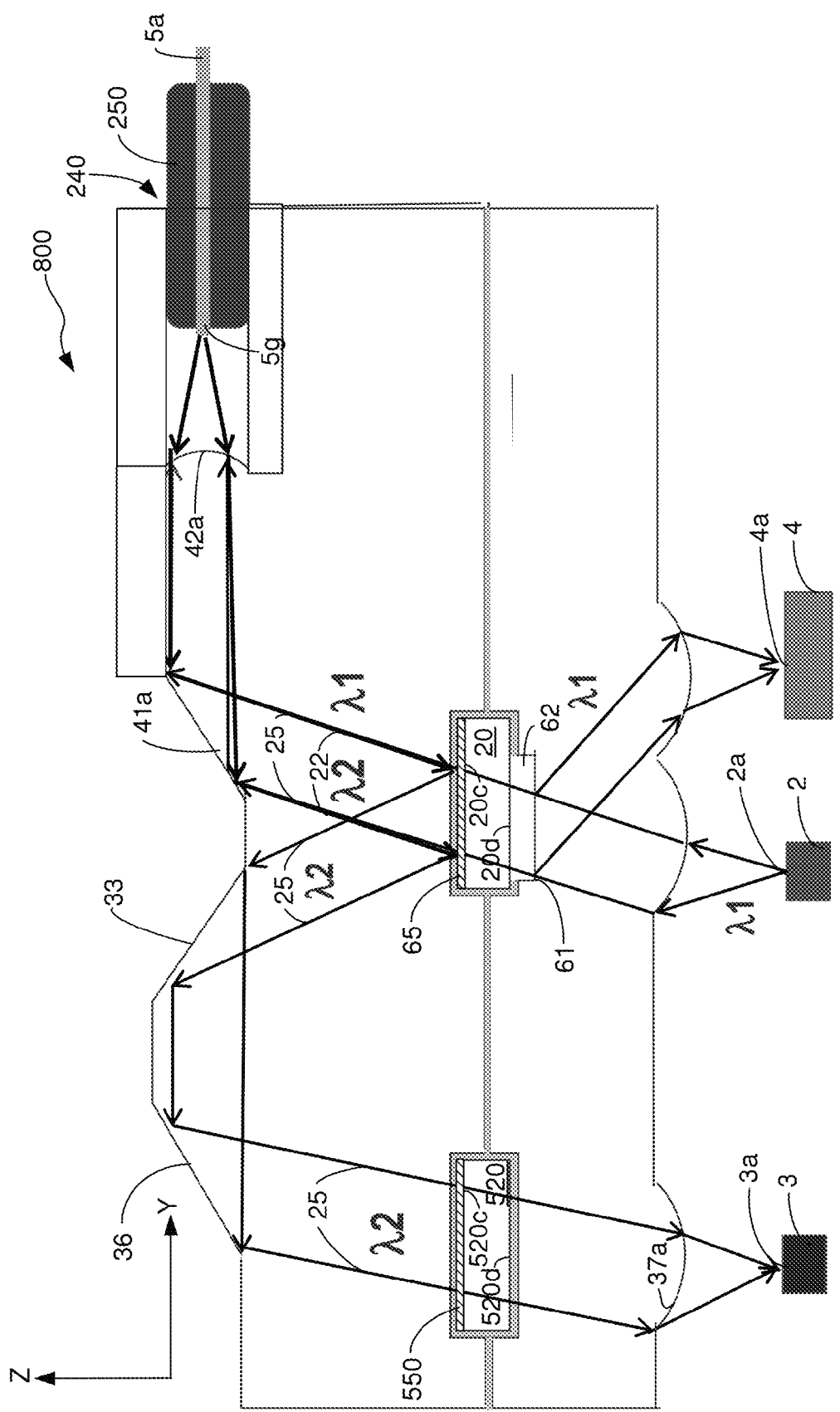
FIG. 12 illustrates a side plan view of a bidirectional parallel optical transceiver module in accordance with another illustrative embodiment.

With respect to FIG. 12, the module 800 is identical to the module 700 shown in FIG. 11 except that the filter 64 shown in FIG. 11 has been replaced by the air gap 62. In all respects, the module 800 operates in the same manner in which the module 700 operates, except that the main beam splitting operation is performed by the air gap 62 rather than the filter 64.

Figure 13:
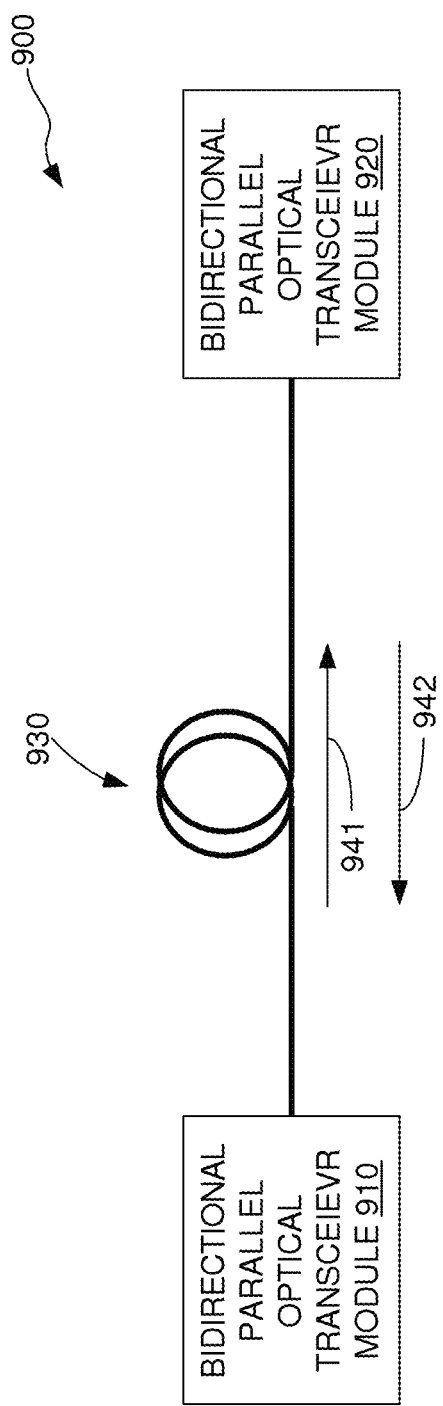
FIG. 13 illustrates a bidirectional optical link that incorporates two bidirectional parallel optical transceiver modules and an optical fiber cable that interconnects the modules.

FIG. 13 illustrates a bidirectional optical link 900 that incorporates two bidirectional parallel optical transceiver modules 910 and 920 and an optical fiber cable 930 that interconnects the modules 910 and 920. The modules 910 and 920 may be any of the modules shown in FIGS. 1-12, or similar modules that incorporate the principles and concepts described above with reference to FIGS. 1-12. The modules 910 and 920 may transmit and receive optical signals of the same wavelength, λ1, or they may transmit and receive optical signals of the first and second wavelengths, λ1 and λ2, respectively. The cable 930 may be, for example, an optical ribbon fiber cable having a number of fibers equal to the number of channels of the modules 910 and 920. For example, in a case where each of the modules 910 and 920 has six channels, the cable 930 would have six fibers. Optical signals are being transmitted and received over each fiber of the cable 930, so optical signals are being carried in both of the directions represented by arrows 941 and 942.

The bidirectional optical link 900 is capable of having a very high bandwidth. For example, assuming that each of the modules 910 and 920 has six channels and that each channel simultaneously transmits at a data rate of 10 Gigabits per second (Gpbs) and receives at a data rate of 10 Gbps for an aggregate data rate of 20 Gbps per channel, then the bidirectional data rate of the link 900 would be: 6×20 Gbps=120 Gbps. Of course, the data rate of the link 900 can be increased by using laser diodes and photodiodes that operate at higher rates and/or by increasing the number of channels that are provided in the modules and the number of fibers of the cable 930. In addition, other measures can be taken to further increase the link data rate, such as using electronic dispersion compensation techniques. Furthermore, because of the in-line, zig-zag configuration of the modules 910 and 920, the channel density of the modules 910 and 920 can be increased while maintaining their compact nature. Also, the compact nature of the modules 910 and 920 allows many of them to be placed side-by-side and/or stacked one on top of the other to allow a large number of the links 900 to be constructed using very little space.

It should be noted that the invention has been described above with reference to a few illustrative embodiments for the purposes of demonstrating the principles and concepts of the invention. The invention is not limited to the embodiments described herein, as will be understood by those of ordinary skill in the art in view of the description provided herein. Many modifications may be made to the embodiments described herein without deviating from the goals or objectives of the invention, and all such modifications are within the scope of the invention.

For example, additional filters may be used in the modules at various locations to further reduce crosstalk and return loss. As another example, beam splitters having shapes and orientations that are different from those shown may be used in the modules. Also, while the optical pathways within the modules have been shown in FIGS. 1-12 as having particular directionalities, the directionalities of these optical pathways may be different from that which is shown. It should also be noted that although the light sources and receive light detectors have been shown in FIGS. 1-12 as being VCSELs and P-I-N diodes, respectively, other light sources and light detectors may be used for this purpose. Also, if it is unnecessary to monitor the optical signals that are produced by the light sources, the arrays of monitoring light detectors (e.g., array 4 in FIG. 1) can be eliminated, in which case the beam splitter 20 would not need to be configured to reflect light portion 28. These and other modifications are within the scope of the invention, as will be understood by those of skill in the art, in view of the description being provided herein.

What is claimed is:

1. A bidirectional parallel optical transceiver module comprising:
   a generally planar mounting surface that lies in a first plane;
   an array of light sources mounted on the mounting surface;
   an array of light detectors mounted on the mounting surface;
   an optics system disposed on the mounting surface above the array of light sources and the array of light detectors, the optics system comprising:
   an upper part that is secured to a lower part by a refractive index matching epoxy;
   a first beam splitter; and
   a pocket disposed between the upper part and the lower part of the optics system, the refractive index matching epoxy surrounding and fixedly positioning the first beam splitter inside the pocket, the first beam splitter having a first filter disposed on an upper side and a second filter disposed on a lower side, wherein first optical signals produced by the array of light sources are incident on the second filter that splits each of the first optical signals into at least first and second portions, the first portions of the first optical signals passing through the refractive index matching epoxy and the upper side of the first beam splitter before being coupled by one or more first optical elements of the optics system into respective end faces of respective optical fibers that are mechanically coupled to the optics system; and
   an array of monitor light detectors mounted on the mounting surface and configured to receive the second portions of the optical signals from the second filter.

2. The bidirectional parallel optical transceiver module of claim 1, wherein the first optical signals produced by the light sources are incident on the lower side of the first beam splitter at respective angles of incidences (AOIs) relative to a normal to the lower side of the first beam splitter, wherein the AOIs range from about 0° to about 15°.

3. The bidirectional parallel optical transceiver module of claim 2, wherein the second filter directs the second portions at respective angles of reflection (AORs) relative to the normal to the lower side of the first beam splitter, wherein the AORs range from about 0° to about 15°.

4. The bidirectional parallel optical transceiver module of claim 3, wherein the first plane corresponds to an X-Y plane of an X, Y, Z Cartesian coordinate system, and wherein each respective monitor light detector, receive light detector and respective light source have a common X coordinate and different Y coordinates in the X-Y plane, and wherein each respective fiber end face has the common X coordinate of the respective light source, monitor light detector and receive light detector and has Y and Z coordinates that are different from the Y and Z coordinates of the respective light source, monitor light detector and receive light detector.

5. The bidirectional parallel optical transceiver module of claim 1, wherein the first plane corresponds to an X-Y plane of an X, Y, Z Cartesian coordinate system, each respective receive light detector and respective light source being in a common line in X and Y dimensions of the X, Y, Z Cartesian coordinate system such that each receive light detector and respective light source have a common X coordinate and different Y coordinates in the X-Y plane, and wherein each respective fiber end face has the common X coordinate of the respective light source and receive light detector and has Y and Z coordinates that are different from the Y and Z coordinates of the respective light source and receive light detector.

6. The bidirectional parallel optical transceiver module of claim 1, further comprising:
   a second beam splitter included in the optics system having at least an upper side and a lower side, and wherein the second optical signals reflected in the first direction are coupled by one or more of the second optical elements onto the second beam splitter, and wherein the second beam splitter allows only respective portions of optical signals that are incident on the upper side of the second beam splitter that are of at least one intended wavelength of light to pass through the second beam splitter and to be coupled by said one or more second optical elements of the optics system onto respective receive light detectors of the array of receive light detectors.

7. The bidirectional parallel optical transceiver module of claim 1, wherein the respective first optical signals produced by the respective light sources of the array of light sources are of a first wavelength, λ1, and wherein the respective optical signals passing out of the respective end faces are of a second wavelength, λ2.

8. The bidirectional parallel optical transceiver module of claim 1, wherein the respective optical signals produced by the respective light sources of the array of light sources are of a first wavelength, λ1, and wherein the respective optical signals passing out of the respective end faces are of the first wavelength, λ1.

9. The bidirectional parallel optical transceiver module of claim 1, wherein the end faces of the optical fibers are mechanically coupled to the optics system by a butt-coupling arrangement.

10. The bidirectional parallel optical transceiver module of claim 1, wherein the end faces of the optical fibers are mechanically coupled to the optics system by a multi-fiber connector.

11. The method of claim 10, wherein the lower side of the respective first beam splitter directs the second portions by reflecting the second portions at respective angles of reflection (AORs) relative to a normal to the lower side of the first beam splitter, and wherein the AORs range from about 0° to about 15°.

12. The method of claim 11, wherein the first plane corresponds to an X-Y plane of an X, Y, Z Cartesian coordinate system, and wherein within each module, each respective receive light detector, respective monitor light detector, and respective light source are in a common line in X and Y dimensions of the X, Y, Z Cartesian coordinate system, wherein each receive light detector, respective monitor light detector, and respective light source have a common X coordinate and different Y coordinates in the X-Y plane, and wherein each respective fiber end face has the common X coordinate of the respective light source, monitor light detector and receive light detector and has Y and Z coordinates that are different from the Y and Z coordinates of the respective light source, monitor light detector and receive light detector.

13. The bidirectional parallel optical transceiver module of claim 1, wherein the second filter is partially reflective and partially transparent to a first wavelength of the first optical signals.

14. The bidirectional parallel optical transceiver module of claim 1, wherein said one or more first optical elements of the optics system include:
a first array of optical elements disposed in between the end faces of the optical fibers and the first beam splitter, each optical element of the first array receiving a respective first portion of the respective first optical signal that passes through the first beam splitter and directing the received first portion onto a respective end face of a respective optical fiber, each respective optical element of the first array receiving a respective second optical signal passing out of a respective end face and directing the respective received optical signal passing out of the respective end face onto the upper side of the first beam splitter.

15. The bidirectional parallel optical transceiver module of claim 14, further comprising:
one or more second optical elements, wherein the second optical signals are reflected by the first beam splitter in a first direction and are coupled by said one or more second optical elements onto respective receive light detectors of the array of receive light detectors, and wherein each of the optical fibers simultaneously transmits and receives the first optical signals coupled into the respective end faces and the second optical signals passing out of the respective end faces, respectively, and wherein said one or more second optical elements of the optics system include a first reflecting surface, wherein the first reflecting surface receives the respective second optical signals reflected in the first direction and reflects the received respective second optical signals in a second direction.

16. The bidirectional parallel optical transceiver module of claim 15, wherein said one or more second optical elements of the optics system further include:
a second reflecting surface, wherein the second reflecting surface receives the respective second optical signals reflected in the first direction and reflects the received second optical signals in a third direction that is toward the respective receive light detectors of the array of receive light detectors.

17. The bidirectional parallel optical transceiver module of claim 16, wherein said one or more second optical elements of the optics system further include:
a second array of optical elements disposed in between the second reflecting surface and the array of receive light detectors, and wherein each optical element of the second array receives a respective second optical signal reflected in the third direction by the second reflecting surface and focuses the respective second optical signal onto a respective receive light detector of the array of receive light detectors.

18. The bidirectional parallel optical transceiver module of claim 17, wherein the optics system further includes:
a third array of optical elements disposed in between the lower side of the first beam splitter and the array of light sources, and wherein each optical element of the third array receives a respective first optical signal produced by a respective light source and directs the respective first optical signal onto the lower side of the first beam splitter.

19. The bidirectional parallel optical transceiver module of claim 18, wherein the optics system further includes:
a fourth array of optical elements disposed in between the lower side of the first beam splitter and the array of monitor light detectors, and wherein each optical element of the fourth array receives a respective second portion directed by the lower side of the first beam splitter toward the monitor light detectors and focuses the respective second portions onto respective monitor light detectors of the array of monitor light detectors.

20. The bidirectional parallel optical transceiver module of claim 14, wherein the first filter is transparent to a wavelength of the first optical signals and is reflective to a wavelength of the second optical signals.

21. The bidirectional parallel optical transceiver module of claim 20, wherein the wavelength of the first optical signals is equal to the wavelength of the second optical signals.

22. The bidirectional parallel optical transceiver module of claim 20, wherein the wavelength of the first optical signals and the wavelength of the second optical signals are different.

23. The bidirectional parallel optical transceiver module of claim 14, wherein the optics system has an air gap adjacent to the lower side of the first beam splitter, and wherein the first filter is transparent to a wavelength of the first optical signals and is reflective to a wavelength of the second optical signals, and wherein the air gap is partially reflective and partially transparent to a first wavelength of the first optical signals.

24. A method for bi-directionally communicating optical signals over an optical link, the method comprising:
providing first and second bidirectional parallel optical transceiver modules mechanically coupled to opposite ends of an optical fiber cable, each module comprising:
a generally planar mounting surface that lies in a first plane;
an array of light sources mounted on the mounting surface;
an array of light detectors mounted on the mounting surface;
an array of monitor light detectors mounted on the mounting surface; and
an optics system disposed on the mounting surface above the array of light sources and the array of light detectors, the optics system comprising:
an upper part that is secured to a lower part by a refractive index matching epoxy;
a first beam splitter; and
a pocket disposed between the upper part and the lower part of the optics system, the refractive index matching epoxy surrounding and fixedly positioning the first beam splitter inside the pocket, the first beam splitter having a first filter disposed on an upper side and a second filter disposed on a lower side, wherein the first optical signals produced by the array of light sources are incident on the second filter that splits each of the first optical signals into at least first and second portions, at least the first portions of the first optical signals passing through the refractive index matching epoxy and the upper side of the first beam splitter before being coupled by one or more first optical elements of the optics system into respective end faces of respective optical fibers of the optical fiber cable, wherein the lower side of the first beam splitter directs the second portions of the optical signals onto respective monitor light detectors of the array of monitor light detectors; and
simultaneously transmitting and receiving optical signals in each of the modules.

25. The method of claim 24, wherein the optical signals produced by the light sources are incident on the lower side of the first beam splitter at respective angles of incidences (AOIs) relative to a normal to the lower side, wherein the AOIs range from about 0° to about 15°.

26. The method of claim 25, wherein said one or more first optical elements of each respective optics system further include:
a first array of optical elements disposed in between the respective end faces of the respective optical fibers and the respective first beam splitter, each optical element of the respective first array receiving a respective first portion of the respective first optical signal that passes through the respective first beam splitter and directing the received first portion onto a respective end face of a respective optical fiber, each respective optical element of the respective first array receiving a respective second optical signal passing out of a respective end face and directing the respective received second optical signal passing out of the respective end face onto the upper side of the respective first beam splitter.

27. The method of claim 26, wherein each respective optics system further includes one or more second optical elements, wherein the second optical signals are reflected by the first beam splitter in a first direction and are coupled by said one or more second optical elements onto respective receive light detectors of the array of receive light detectors, and wherein each of the optical fibers simultaneously transmits and receives the first optical signals coupled into the respective end faces and the second optical signals passing out of the respective end faces, respectively, and wherein said one or more second optical elements of each respective optics system include a first reflecting surface that receives the respective second optical signals reflected in the first direction and reflects the received respective second optical signals in a second direction.

28. The method of claim 27, wherein said one or more second optical elements of each respective optics system further include:
a second reflecting surface, wherein the second reflecting surface receives the respective second optical signals reflected in the first direction and reflects the second optical signals in a third direction toward the array of receive light detectors.

29. The method of claim 28, wherein said one or second optical elements of each respective optics system further include:
a second array of optical elements disposed in between the respective second reflecting surface and the respective array of receive light detectors, and wherein each optical element of the respective second array receives a respective second optical signal reflected in the third direction by the second reflecting surface and focuses the respective second optical signal onto a respective receive light detector of the respective array of receive light detectors.

30. The method of claim 29, wherein each respective optics system further includes:
a third array of optical elements disposed in between the lower side of the respective first beam splitter and the respective array of light sources, and wherein each optical element of the respective third array receives a respective first optical signal produced by a respective light source and directs the respective first optical signal onto the lower side of the respective first beam splitter.

31. The method of claim 30, wherein each respective optics system further includes:
a fourth array of optical elements disposed in between the lower side of the respective first beam splitter and the respective array of monitor light detectors, and wherein each optical element of the respective fourth array receives a respective second portion reflected by the lower side of the respective first beam splitter toward the monitor light detectors and focuses the respective reflected second portion onto a respective monitor light detector of the respective array of monitor light detectors.

32. The method of claim 27, wherein each respective optics system further includes:
a second beam splitter, the second optical signals reflected in the first direction are coupled by one or more of the second optical elements onto the second beam splitter, and wherein the respective second beam splitter allows only respective portions of the second optical signals that are incident on the upper side of the respective second beam splitter that are of at least one intended wavelength of light to pass through the respective second beam splitter and to be coupled by the respective optics system onto respective receive light detectors of the respective array of receive light detectors.

33. The method of claim 27, wherein the respective first optical signals produced by the respective light sources of the array of light sources of the first module are of a first wavelength, $\lambda 1$, and wherein the respective second optical signals passing out of the respective end faces of the fibers coupled to the first module are of a second wavelength, $\lambda 2$, and wherein the respective first optical signals produced by the respective light sources of the array of light sources of the second module are of the second wavelength, $\lambda 2$, and wherein the respective second optical signals passing out of the respective end faces of the fibers coupled to the second module are of the first wavelength, $\lambda 1$.

34. The method of claim 27, wherein the respective first optical signals produced by the respective light sources of the array of light sources of the first and second modules are of a first wavelength, $\lambda 1$, and wherein the respective second optical signals passing out of the respective end faces of the fibers coupled to the first and second modules are of the first wavelength, $\lambda 1$.

35. The method of claim 24, wherein the first plane corresponds to an X-Y plane of an X, Y, Z Cartesian coordinate system, within each module, each respective receive light detector and respective light source are in a common line in X and Y dimensions of the X, Y, Z Cartesian coordinate system such that each receive light detector and respective light source have a common X coordinate and different Y coordinates in the X-Y plane, and wherein each respective fiber end face has the common X coordinate of the respective light source and receive light detector and has Y and Z coordinates that are different from the Y and Z coordinates of the respective light source and receive light detector.

36. A bidirectional parallel optical transceiver module for communication over a bidirectional optical link, the transceiver module comprising:

an array of light sources, an array of receive light detectors and an array of monitor light detectors mounted substantially parallel to one another on a mounting surface, each light source being capable of producing a respective first optical signal of a first wavelength in response to receiving a respective electrical signal, each light detector being capable of producing a respective electrical signal in response to receiving a respective second optical signal of the first wavelength; and an optics system disposed on the mounting surface, wherein end faces of a plurality of optical fibers of at least one optical fiber cable are mechanically coupled to the optics system, and wherein the optics system includes:

an upper part that is secured to a lower part by a refractive index matching epoxy;

a first beam splitter; and a pocket disposed between the upper part and the lower part of the optics system, the refractive index matching epoxy fixedly positioning the first beam splitter inside the pocket, the first beam splitter having a first filter disposed on an upper side and a second filter disposed on a lower side, wherein the first optical signals produced by respective light sources are incident on the second filter that splits each of the first optical signals into at least first and second portions, the first portions of the first optical signals passing through the lower and upper sides of the first beam splitter and being coupled by the optics system into respective end faces of the respective optical fibers, the second portions being directed by the first beam splitter onto respective monitor light detectors of the array of monitor light detectors, and wherein second optical signals passing out of respective end faces of respective optical fibers are incident on the upper side of the first beam splitter and are reflected thereby and redirected by the optical coupling system in a direction toward the array of receive light detectors.

* * * * *